United States Patent [19]
Diperstein

[11] Patent Number: 5,341,554
[45] Date of Patent: Aug. 30, 1994

[54] METHOD FOR REPAIRING A CRACKED METAL PART USING REPAIR PLUGS COATED WITH A SURFACE LAYER OF ZINC

[76] Inventor: David Diperstein, 125 Bickley Rd., Glenside, Pa. 19038

[21] Appl. No.: 63,388

[22] Filed: May 18, 1993

Related U.S. Application Data

[63] Continuation-in-part of Ser. No. 926,082, Aug. 5, 1992, abandoned.

[51] Int. Cl.5 .................................................. B23P 6/04
[52] U.S. Cl. ................................. 29/402.17; 29/402.09; 29/530
[58] Field of Search ........... 29/402.17, 402.19, 402.16, 29/402.18, 530, 402.15

[56] References Cited
U.S. PATENT DOCUMENTS

| | | |
|---|---|---|
| 2,998,645 | 9/1961 | Diperstein . |
| 4,247,973 | 2/1981 | Diperstein . |
| 4,599,781 | 7/1986 | Diperstein . |
| 4,640,052 | 2/1987 | Zebedee et al. . |
| 4,662,806 | 5/1987 | Reed . |

*Primary Examiner*—Mark Rosenbaum
*Assistant Examiner*—David P. Bryant
*Attorney, Agent, or Firm*—Seidel, Gonda, Lavorgna & Monaco

[57] ABSTRACT

An improvement to the method for repairing a cracked metal wall commonly known as cold welding, which is accomplished by inserting metal locks across a crack to join the metal on opposite sides of the gap, and then inserting repair plugs which act as plugs to fill the gap and simultaneously pre-stress the inserted locks. The improvement comprises the use of repair plugs which have been coated with an electro-deposited layer of zinc. The zinc layer improves the sealing capability of the repair plugs, and is thereby advantageous for repairing cracks in the pressure areas of engine blocks or other vessels, containers or housings which contain fluids under pressure.

13 Claims, 2 Drawing Sheets

METHOD FOR REPAIRING A CRACKED METAL PART USING REPAIR PLUGS COATED WITH A SURFACE LAYER OF ZINC

This is a continuation-in-part of copending application Ser. No. 07/926,082, filed Aug. 5, 1992, now abandoned.

TECHNICAL FIELD OF THE INVENTION

This invention is related to a method for repairing a cracked metal wall, commonly known as cold welding, which is accomplished by inserting metal locks across a crack to join the metal on opposite sides of the gap, then inserting tapered plugs to fill the gap and simultaneously pre-stress the inserted locks. In particular, this invention relates to an improvement to such method by the use of an improved repair plug which increases the sealing capability, and is thereby advantageous for repairing cracks in the pressure areas of engine blocks or other vessels, containers or housings which contain fluids under pressure.

BACKGROUND OF THE INVENTION AND ART

Cold welding techniques are useful for repairing cast metal parts, since thermal welding and brazing techniques can cause the fused area to become hard and brittle. Prior methods and apparatus used for cold welding cracks in metal parts are disclosed in my U.S. Pat. Nos. 2,998,645; 4,247,973; and 4,599,781, the disclosures of which are incorporated herein by reference.

The basic method and apparatus is disclosed in U.S. Pat. No. 2,998,645, relating to my invention of tapered plugs to fill the gap and simultaneously pre-stress the locks to inhibit them from working out of the metal due to vibration or cyclic expansion. I also disclose therein a repair plug with a groove-weakened head section designed to shear away at set torque, as a preferred embodiment of tapered plug.

In U.S. Pat. No. 4,247,973, I disclose my invention of a jig tool for aligning a drill bit to facilitate drilling the overlapping hole pattern required for the locks, and the method of using the tool. In U.S. Pat. No. 4,599,781, I disclose my invention of an improvement which is advantageous for repairing cracks in thin metal parts, using small-diameter repair plugs with increased threads per inch.

While the above methods, apparatus and tools are useful for repairing cracks in any cast metal wall, they are extensively used to repair cracks in the combustion and water-jacket areas of automotive engines, where high pressure makes soldering an unacceptable mode of repair. Automotive engine cylinder heads and blocks are usually cast aluminum or iron. The inserted locks act as a staple across a crack to prevent it from propagating by further separation of the metal, while the repair plugs seal the gap and pre-stress the locks.

Consequently, the effectiveness of the seal is dependent upon the degree to which the embedded surfaces of repair plugs are effective in maintaining sealing contact with the threaded bores drilled into the casting. Where the crack is in the wall of a vessel used to contain a fluid under pressure, such as the above described cylinder heads and blocks, or steam pipes, hydraulic reservoirs, and similar containers or housings, it would be advantageous to increase the sealing effectiveness of the repair plugs.

I have found that my present invention achieves such increased sealing effect, and describe hereafter the method and apparatus for achieving this enhanced seal.

The manner in which such objects are achieved by the present invention will be apparent upon reading the detailed description which follows, with reference to the drawings for illustration of a particular embodiment. By way of overview, and to assist cursory searchers who do not wish to read the entire disclosure, the following section is provided as a brief summary disclosure of the invention in perfunctory and informal terms. However, persons seeking to understand the full scope of the invention should be aware that such under-standing can only come from careful reading of the claims found at the end of this document.

SUMMARY DISCLOSURE OF THE INVENTION

A method of repairing a cracked metal part wherein one or more series of overlapping blind holes are drilled across the crack and a metal lock is inserted in each series of holes, and wherein repair plugs are threaded into holes drilled and tapped along the crack to seal the crack and to pre-stress the inserted locks, the improvement comprising the step of using repair plugs which have a surface coating of zinc.

BRIEF DESCRIPTION OF THE DRAWINGS

For the purpose of illustrating the invention, the drawings show a form which is presently preferred; it being understood, however, that this invention is not limited to the precise arrangement and instrumentalities shown.

BEST MODE FOR CARRYING OUT THE INVENTION

Without repeating all of the details already disclosed in the three United States patents identified above, the following is a description of the best mode for carrying out the invention in the repair of a cracked cast iron cylinder block.

For purpose of this example, the cast metal wall will be considered to be nominally ¼" thick, the locks used are a 5-lobe type with 3/16" lobe diameter, and the repair plugs have a one-inch threaded shaft with 27 threads per inch, tapering from 0.225" bottom diameter to 0.275" top diameter. These parameters fall within the method for repairing a thin metal part which is disclosed in U.S. Pat. No. 4,599,781. Those familiar with the art of cold welding will recognize this as a common configuration, and will readily understand how to modify this description for other dimensions and materials.

To repair a cast iron cylinder block having a metal wall (10), which has a crack (12) extending through the wall, it is recommended to first determine the entire length of the crack, including subsurface defects, with a magnetic crack-detection device or other appropriate sensor, and then center punch along the entire crack to mark a trace line on the surface of the metal.

Figure 1:
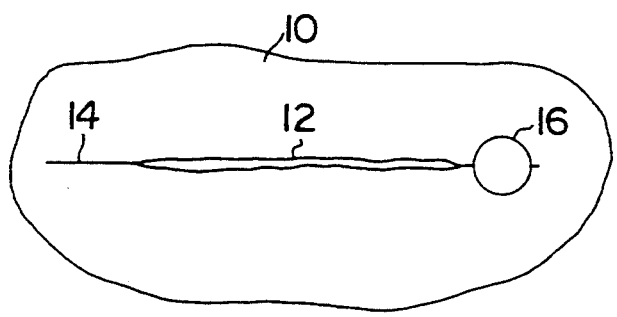
FIG. 1 is a plan view of a crack in a metal wall with a first hole drilled slightly beyond one end of the crack.
Figure 2:
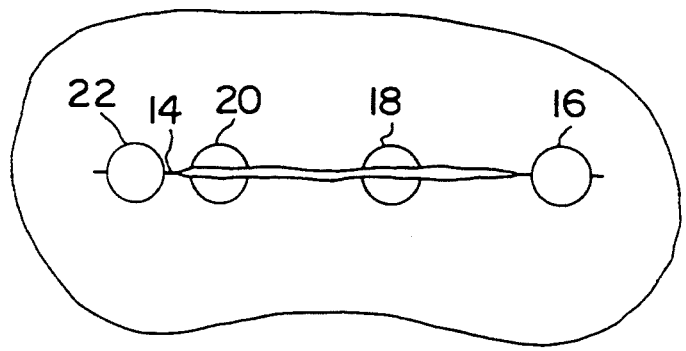
FIG. 2 is a schematic of the drilling pattern at an intermediate stage of the repair.
Figure 3:
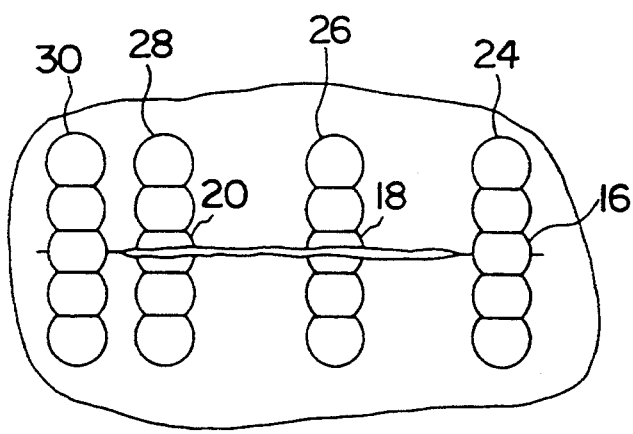
FIG. 3 is a schematic of the drilling pattern at an later intermediate stage of the repair than the stage of FIG. 2.

Once a trace (14) is made, a first hole (16) may be drilled slightly beyond one end of the trace, as illustrated in FIG. 1. For these dimensions and locks, the hole (16) is drilled with a 3/16" bit, preferably having a relatively flat (135°) tip, to a depth of 3/32". Starting from hole (16), a line of holes (18-22) identical to the starting hole (16) are drilled in the crack until the final hole (22) is beyond the opposite end of the trace, as shown in FIG. 2. To join the metal on opposite sides of the gap, a 5-hole series of overlapping holes is drilled for each lock. The holes (18-22) will be the center bores of each 5-hole series (24-30), as shown in FIG. 3.

The holes (18-22) are preferably spaced apart at 3/4" centers to permit three repair plugs to be inserted between locks; however, the spacing may be reduced to allow only one repair plug at the opposite end, as shown by the last hole (22), if that is necessary to prevent the hole pattern from falling on an obstruction. With the holes (18-22) as centers, a series of overlapping holes (24-30) may be drilled in the manner described in U.S. Pat. No. 4,247,973. The holes for the locks should not be drilled entirely through the wall of the casting (the 3/32" depth in a 1/4" wall is sufficient).

Figure 4:
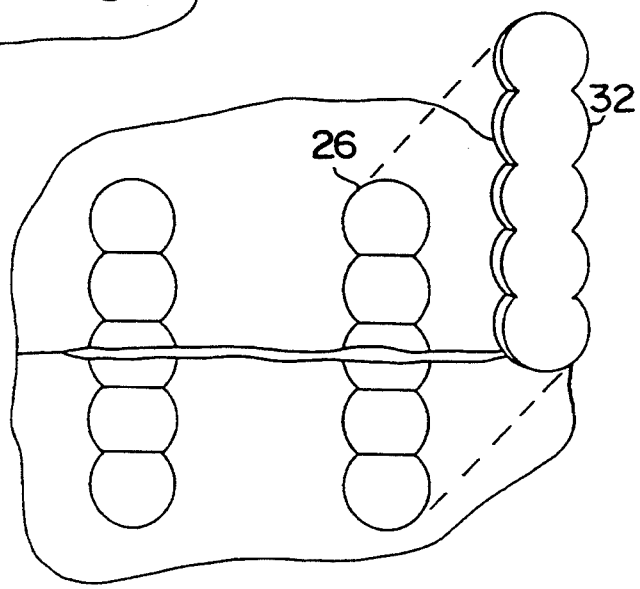
FIG. 4 is an exploded schematic depicting a lock positioned for insertion into one of the series of overlapping holes shown in FIG. 3.
Figure 5:
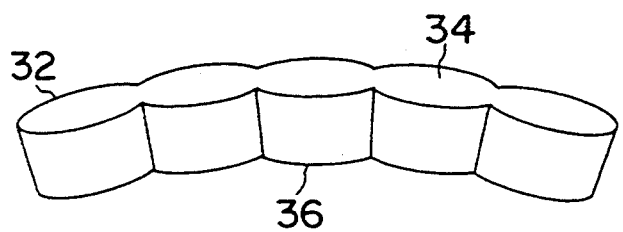
FIG. 5 is a side oblique of a lock.

After the series of overlapping holes for all of the locks are drilled, a lock (32) is inserted in each series, as lo shown in FIG. 4. It is recommended to place a few drops of liquid sealant such as FLUID WELD ® into each 5-hole series before inserting its lock. As shown in FIG. 5, each lock (32) is curved in elevation, having a convex face (34) and a concave face (36). The lock is inserted with its concave face (36) down, and drifted into position by light hammering. Once all locks are inserted, the tops of the locks may be flattened by an air hammer with round-end peening tip.

Figure 6:
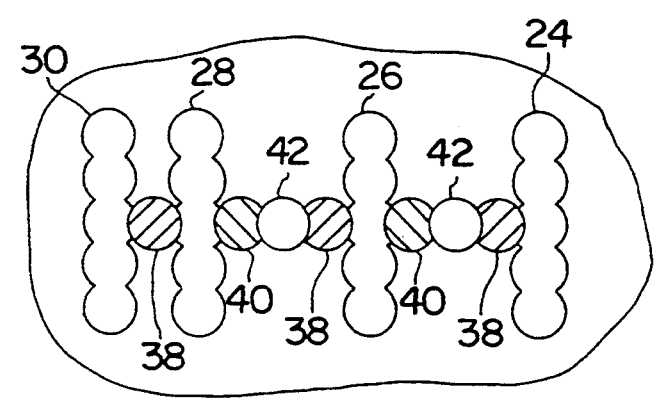
FIG. 6 is a schematic of the drilling pattern at a later stage of the repair following insertion of the locks.

Additional holes (38-42) are then drilled and tapped along the crack to accept tapered repair plugs (44). The additional holes are made contiguous to each other and to the center hole of the 5-lobe locks along the entire crack, as illustrated in FIG. 6. In practice, the 3/4 inch spacing between lock centers allows three 3/16th diameter holes to be properly placed in the crack.

Figure 7:
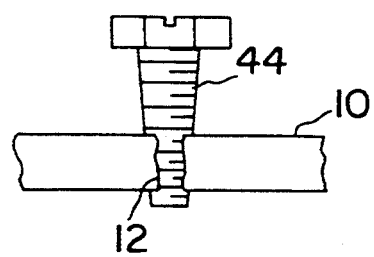
FIG. 7 is a side view of a tapered threaded repair plug having a surface coating of electro-deposited zinc extending through the wall of a metal part at the crack.

Holes (38-42) should be drilled and sealed in a particular order. An initial hole (38) is drilled in the crack on the same side of each lock, starting from the first lock hole (16) as shown in FIG. 6, drilling the 3/16" bit entirely through the casting. The initial holes (38) bite slightly into the center lobe of its adjacent lock. The initial holes (38) are then threaded with a tapered tap for a 27-thread per inch pattern which matches that of the tapered repair plugs. A repair plug (44) is then inserted into each of the initial holes, as shown in FIG. 7, and torqued until the bolt head shears away. The same procedure is repeated on the opposite side of each interior lock, that is drilling, tapping and sealing holes (40). Then middle holes (42) are drilled, tapped and sealed in the remaining portion of the gap.

Figure 8:
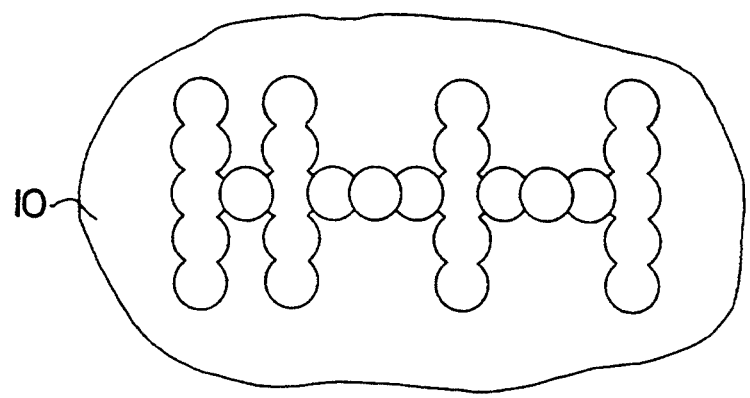
FIG. 8 is a plan view of a completed repair according to the inventions.

The portions of the sheared repair plugs (44) that extend above the metal part may be flattened by air hammer peening as described above. The entire repair surface is then peened with a fine peening tip until it is a solid shape flush with the cast iron wall, as in FIG. 8.

Any burrs or excess material from the repair may be removed by grinding and polishing.

An important objective of cold welding is returning structural integrity to the metal, and, since the wall of the cylinder block encloses combustion gasses, it is also important to maintain an effective seal between the tapered bolts and the bore walls the cast iron. This invention improves the seal by utilizing repair plugs which are coated with a surface layer of zinc, The zinc layer may be coated on the repair plugs by an electroplating process using spheres of pure zinc as the source material electrode in the electro-plating tank. It is expected, although not known, that other galvanizing processes, such as hot dipping or sherardizing, will produce repair plugs having better sealing capacity due to the zinc coating layer. Although the invention is directed primarily to the use of zinc-coated repair plugs, the locks are preferably also coated with zinc.

Coating ferrous parts with zinc is well known as common practice to inhibit corrosion. However, coating the repair plugs which are used in this method with a zinc layer provides the unexpected result of increasing the strength of the seal between the repair plugs and the original metal. Without being bound to a particular theory or explanation for this result, it may be attributable to the malleability of the relatively soft zinc in filling the interstitial areas between the repair plug and wall threads, to an ionic bonding of the dissimilar metals, or to a combination of both effects. In particular, it is believed that the zinc coating on the repair plug may soften somewhat at the operating temperature of a typical internal combustion engine, thereby further contributing to the flow of zinc into the interstitial areas. It may be appreciated that this enhanced sealing effect is not possible unless the repair plug is zinc coated, since the repair plug per se, which is formed of steel or cast iron, will not be malleable at internal combustion temperatures.

The unexpected enhanced sealing effect was confirmed by the following test. A simple pressure cylinder was created from a 2 inch diameter cast iron pipe of between 1/8 and 1/4 inch wall thickness. Both ends of the cylinder were threaded and caps were screwed onto the threaded ends to enclose the vessel. An air fitting was installed on one end cap. Two holes were drilled and tapped in the cylinder using a tapered tap, in the manner described above. A plain repair plug and an identical but zinc-coated repair plug were installed to the same torque for uniformity (rather than the torque-to-shear procedure described above). The cylinder was then filled with water, closed and pressurized with compressed air. The pipe was then subjected to increasing pressure to determine the pressure at which each the two plugs began to show an air leak. The pressure was monitored via a pressure gauge on the air compressor supplying the closed cylinder with air. The test was repeated with eleven other coated/uncoated repair plug pairs. On average, the zinc-plated repair plugs were able to withstand twice the pressure of uncoated plugs without leaking. In some of the pairs, a difference as high as 50 lbs. per square inch was recorded.

Industrial Applicability

This invention is expected to be used extensively by repair facilities for gasoline and diesel engines. It may find further use in any repair facility where it is frequent to repair cracks in cast iron or cast aluminum vessels, housing or containers for fluids under pressure.

The present invention may be embodied in other specific forms without departing from the spirit or essential attributes thereof and, accordingly, reference should be made to the appended claims, rather than to the foregoing specification, as indicating the scope of the invention.

I claim:

1. A method of repairing a cracked metal part having an outer surface, comprising the steps of:
   providing a series of overlapping blind holes extending away from and intersecting a crack in the part;
   fixedly securing a lock in said series of overlapping blind holes;
   providing a hole in said part that overlaps a portion of said lock and a portion of said crack;
   securing a repair plug coated with a surface layer of zinc in said hole; and
   removing any portion of said plug which extends beyond the outer surface of said part.

2. A method of repairing a cracked metal part having an outer surface, comprising the steps of;
   providing a series of overlapping blind holes extending from and intersecting a crack in the part;
   fixedly securing a lock in said series of overlapping blind holes;
   providing a hole through said crack in a manner so that said hole overlaps a portion of said lock;
   tapping said hole with a tap;
   threading a repair plug coated with a surface layer of zinc and having a weakened portion intermediate its length in said tapped hole;
   said step of threading said repair plug including the application of a turning torque to a head on said repair plug until said repair plug fails in shear at said weakened point; and
   removing any portion of said repair plug extending beyond the outer surface of said part.

3. A method of repairing a cracked metal wall having an outer surface, comprising the steps of:
   providing a first series of overlapping blind holes extending away from and intersecting a crack in the wall;
   providing a second series of overlapping blind holes extending away from and intersecting said crack;
   fixedly securing a lock in each of said first and second series of overlapping blind holes;
   providing a plurality of overlapping repair plugs, each of which is coated with a surface layer of zinc, in said wall along said crack between said locks; and
   removing any portion of each repair plug which extends beyond the outer surface of said wall.

4. A method in accordance with claim 3, wherein said step of providing a plurality of overlapping zinc-coated repair plugs is performed in such a manner that some of said repair plugs also overlap a portion of lock.

5. A method in accordance with claim 3, wherein said zinc-coated repair plugs are provided with a weakened portion intermediate their length, and wherein said step of providing a plurality of overlapping repair plugs includes the application of a turning torque to said plugs of sufficient strength to shear said repair plugs at said weakened portion.

6. A method in accordance with claim 3, wherein said step of securing a lock in each of said first and second series of overlapping blind holes includes securing a zinc-coated lock in said holes.

7. A method of repairing a cracked thin metal part having an outer surface, comprising the steps of:
   providing a hole of diameter no greater than 0.200" in a crack in the part;
   tapping the hole with a tap having more than 27 threads per inch;
   securing a plug coated with a surface layer of zinc and having the same number of threads per inch as the tapped hole in the tapped hole; and
   torqueing the plug until the torqueing force exceeds the strength of the plug, whereby a portion of the plug extending beyond the outer surface of the part snaps off.

8. A method in accordance with claim 7 wherein the hole is provided using a tapered drill to bore a tapered hole.

9. A method in accordance with claim 7 wherein the hole is provided with a straight untapered drill, and the hole is tapped with a tapered tap.

10. A method of repairing a cracked thin metal part having an outer surfac,e comprising the steps of:
    providing a first series of overlapping holes intersecting and extending generally perpendicular to a crack in the part;
    providing a second series of overlapping holes intersecting and extending generally perpendicular to the crack;
    fixedly securing a lock in each of the series of overlapping holes;
    providing a hole of diameter no greater than 0.200 inches in the crack between the locks so that the hole overlaps a portion of one of the locks;
    tapping the last-mentioned hole with a tap having more than 27 threads per inch;
    securing a plug which is coated with a surface layer of zinc and having the same number of threads per inch as the tapped hole in the tapped hole; and
    torquing the plug until the torquing force exceeds the strength of the plug whereby a portion of the plug extending beyond the outer surface of the part snaps off near the outer surface of the part.

11. A method in accordance with claim 10, wherein each of the first and second series of overlapping holes are bored only partially through the metal part to form a series of blind holes.

12. A method in accordance with claim 10, wherein said part is ⅛ inch or less cast iron or 174 inch or less cast aluminum.

13. A method in accordance with claim 10, wherein said step of securing a lock in each series of overlapping blind holes includes securing a zinc-coated lock in said holes.

* * * * *